Sept. 20, 1971   A. FISCHER   3,605,323
ASSEMBLY KIT

Filed Aug. 19, 1969   2 Sheets-Sheet 2

INVENTOR
ARTUR FISCHER
BY
ATTORNEY

United States Patent Office 3,605,323
Patented Sept. 20, 1971

3,605,323
ASSEMBLY KIT
Artur Fischer, 219 Altheimer Str.,
D-7241 Tumlingen, Germany
Filed Aug. 19, 1969, Ser. No. 851,233
Claims priority, application Germany, Aug. 20, 1968,
P 17 28 064.7
Int. Cl. A63h *33/10*
U.S. Cl. 46—26                                      9 Claims

ABSTRACT OF THE DISCLOSURE

In an assembly kit are provided a plurality of structural components, and a coupling element for coupling respective ones of the structural components to one another. The coupling element comprises a helically convoluted spring member having opposite ends. Mating connecting portions are provided on the structural components and on opposite ends of the spring member.

BACKGROUND OF THE INVENTION

The present invention relates generally to assembly kits, and more particularly to assembly kits for play purposes, such as for the erection of toy models and the like.

It is already known, for instance from my copending application Ser. No. 514,165, filed Nov. 8, 1965, to provide assembly kits comprising a plurality of block-shaped structural elements which, utilized in conjunction with other components, may be used for erecting models, such as buildings, vehicles, machines or the like. The block-shaped elements are provided in one or more of their exterior surfaces with undercut grooves and/or on one or more of their exterior surfaces with projecting undercut coupling heads whose configuration is such that they can be matingly received in these grooves. Thus, one such structural element can be connected to another by inserting a coupling head 1 into an undercut groove of the other structural element.

However, while this has been found to be a highly advantageous manner of connecting such structural elements to one another, the connection is necessarily rigid and provides only sliding movements of thus-connected structural elements with respect to one another—as the coupling head of one is slidably moved along the undercut groove of the other—or, depending upon the cross-sectional configuration of the coupling head, possibly also turning movement about an axis defined by the coupling head. Flexible displacement of thus-connected structural elements with reference to one another is not possible. This, however, is frequently desirable, because there are often applications where it is for instance advisable or even necessary to have the possibility of displacing such structural elements with reference to one another while they remain connected, and to subsequently have them be subjected to a certain biassing force resulting from such displacement. For instance, if a model is constructed which requires sliding contact for taking-off of electrical energy from a rail or the like, it is necessary that the sliding contact be firmly pressed against the rail.

SUMMARY OF THE INVENTION

It is, accordingly, an object of the present invention to provide these sought-after advantages which have been outlined herebefore.

More particularly it is an object of the present invention to provide a coupling element for coupling together structural elements of the type which have been mentioned earlier.

In pursuance of the above objects, and others which will become apparent hereafter, one feature of my invention resides, in an assembly kit, in the combination of a plurality of structural elements, a coupling element for coupling respective ones of these structural elements to one another and comprising a helically convoluted spring member having opposite ends, and mating connecting portions provided on the structural elements and on the opposite ends of the spring member.

The spring member may be a helically convoluted spring and the connecting portions are undercut grooves and/or coupling heads which mate with complementary similar coupling portions provided on the structural elements with which the coupling element is to be connected. Thus, by utilizing my novel coupling element I make it possible to flexibly connect two structural elements of the type under discussion with one another. A current take-off provided on one of these structural elements can therefore be firmly urged against a current-carrying rail by having the one structural element displaced with reference to the other structural element—which is stationarily mounted, for instance—in such a manner as to tension the spring member. Of course, other applications will offer themselves readily, but this one has been mentioned for explanatory purposes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
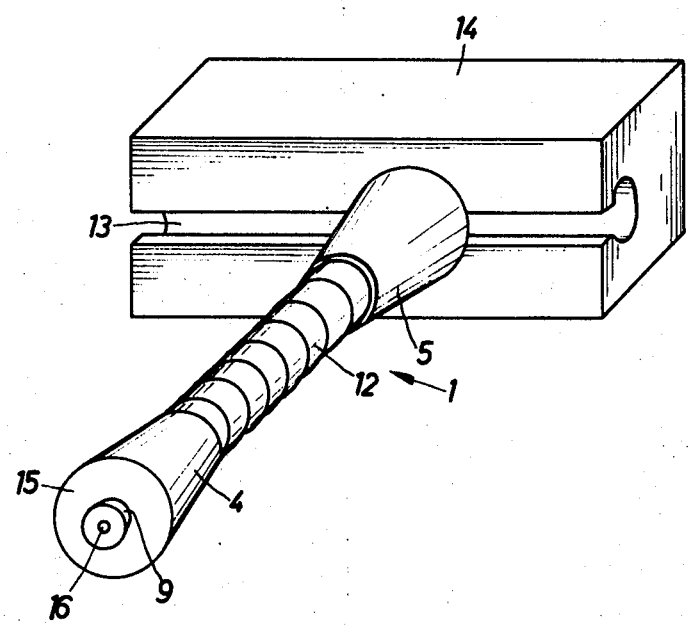
FIG. 1 is a perspective view of a structural element and of the improved coupling element which is separably connected to the structural element.

Reference numeral 1 identifies the novel coupling element per se. As the drawing shows, it comprises a spring member 12 which in the illustrated embodiment is in form of a helically convoluted leaf spring, and two end sections 4 and 5 of the illustrated or another suitable configuration. In accordance with the present invention the end sections 4 and 5 have abutment faces 15 (one visible) which abut against that surface of the respective structural element (one shown) with whose undercut groove 13 the respective end section 405 is to be connected. It is emphasized that one, two or more of the surfaces on the structural element 14 may be provided with the undercut grooves 13 whose cross-sectional configuration is visible.

Projecting from the abutment face 15 is a coupling head 9 which is cross section corresponds to that of the undercut groove 13, or is at least so configurated that it can be matingly received in the undercut groove 13 by endwise insertion, but cannot be withdrawn transversely to the elongation of the groove 13 once inserted. Such coupling heads are shown in detailed in my aforementioned copending application to which reference may be had.

Figure 2:
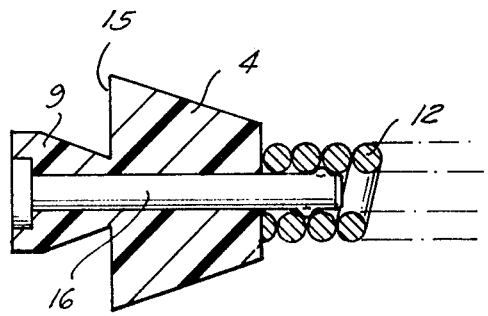
FIG. 2 is a fragmentary sectional detail view of a further embodiment of the coupling element.
Figure 3:
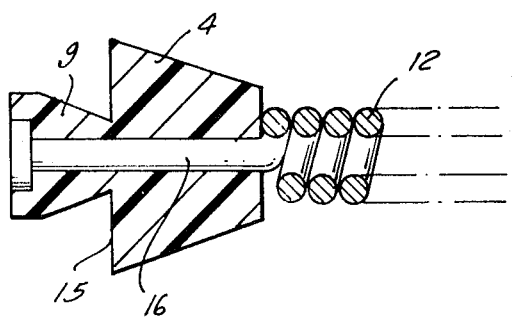
FIG. 3 is a view similar to FIG. 2, but of still another embodiment of the coupling element.

A pin 16 extends through the respective coupling heads 9 and the associated end section 4 or 5, to connect these end sections to the spring member 12. Such connections may be rigid and immovable, or they may permit turning movement of the coupling head 9 and/or the respective end section 4 or 5 with respect to the spring member 12. The pin 16 may be a separate member or it may be of one part with the spring member 12 as shown in FIG. 3. If it is a separate member, it may be pressed into the interior of the helically convoluted spring member 12, with its inner end so configurated as to prevent it from being withdrawn (this is shown in FIG. 2), or it may be provided with cooperating engagement portions engaging complementary portions in the interior of the spring member 12.

It is clear that the end sections 4 and 5 can themselves be configurated as coupling heads capable of being matingly received in the grooves 13. In this case the coupling heads 9 would of course be omitted. However, the illustrated configuration is particularly advantageous because of the good support afforded by the abutment faces 15. Also, while it is not necessary for either the sections 4, 5 or the coupling heads 9 to be turnable with respect to the spring member 12, it has been found that once inserted into the respective undercut grooves 13, the coupling heads 9 are difficult to turn so that the possibility of turning them with respect to the spring member 12 constitutes an advantage.

It should be understood that instead of the coupling heads 9, the end sections 4 and 5 may also be provided with undercut grooves analagous to the one identified with reference numeral 13 on the structural element 14. In that case the structural element 14 will be connected to the respective end section 4 or 5 by introducing a male coupling head of the structural element 14—which has above been described as being normally provided with at least one such male coupling head in any case—into such undercut groove of the respective end section 4 or 5. Furthermore, one of the end sections 4 or 5 may be provided with such an undercut groove and the other end section may then be provided with a coupling head 9, if desired.

Of course, the pins 16 may also be omitted and the coupling heads 9 may be made rigid with or of one piece with the respective end sections 4 or 5.

The end sections 4 or 5 and the coupling heads 9 may be made from synthetic plastic material, and synthetic plastic material or metallic material may be used for the spring member 12.

It will be understood that each of the elements described above, or two or more together, may also find a useful application in other types of constructions differing from the types described above.

While the invention has been illustrated and described as embodied in an assembly kit, it is not intended to be limited to the details shown, since various modifications and structural changes may be made without departing in any way from the spirit of the present invention.

What is claimed as new and desired to be protected by Letters Patent is set forth in the appended claims.

I claim:
1. In an assembly kit, the combination comprising a plurality of structural elements; a coupling element for coupling respective ones of said structural elements to one another, said coupling element comprising a helically convoluted spring member having opposite ends; and mating undercut connecting portions provided on said structural elements and on said opposite ends of said spring member, respectively.

2. In an assembly kit as defined in claim 1, wherein said spring member is a helically convoluted leaf spring.

3. In an assembly kit as defined in claim 1, said undercut connection portions comprising male and female connecting portions; and wherein at least one of said opposite ends of said spring member is provided with a male connecting portion.

4. In an assembly kit as defined in claim 3, wherein the other of said opposite ends is provided with a female connecting portion.

5. In an assembly kit as defined in claim 1, said undercut connecting portions comprising male and female connecting portions; and wherein at least one of said opposite ends of said spring member is provided with a female connecting portion.

6. In an assembly kit as defined in claim 1, and further comprising terminal sections provided on said opposite ends of said spring member, said undercut connecting portions being provided on said terminal sections.

7. In an assembly kit as defined is claim 6, said terminal sections each having an abutment face which abuttingly engages an associated structural element in response to mating engagement of said undercut connecting portions on said associated structural element and the respective terminal section.

8. In an assembly kit as defined in claim 6, said coupling element having a longitudinal axis, and said terminal sections being turnable with reference to said spring member about said longitudinal axis.

9. In an assembly kit as defined in claim 6, and further comprising a pin penetrating each of said terminal sections and connected with said spring element so as to secure the former to the latter.

References Cited

UNITED STATES PATENTS 3,509,642    5/1970    Brumlik _____ 46—26X
3,510,962    5/1970    Sato _____ 46—26X LOUIS G. MANCENE, Primary Examiner D. L. WEINHOLD, JR., Assistant Examiner